(12) United States Patent
Rice et al.

(10) Patent No.: US 10,598,041 B2
(45) Date of Patent: Mar. 24, 2020

(54) INLET PERFORMANCE MEASUREMENT SYSTEM FOR GAS TURBINE ENGINE

(71) Applicant: United Technologies Corporation, Farmington, CT (US)

(72) Inventors: William W. Rice, South Glastonbury, CT (US); Alfred F. Covino, Simsbury, CT (US); Richard C. Hendricks, Tolland, CT (US); Douglas H. Thomesen, Cromwell, CT (US); Bryan J. Hackett, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 327 days.

(21) Appl. No.: 15/789,153

(22) Filed: Oct. 20, 2017

(65) Prior Publication Data

US 2019/0120079 A1    Apr. 25, 2019

(51) Int. Cl.
*F01D 21/00* (2006.01)
*F02C 7/04* (2006.01)
(Continued)

(52) U.S. Cl.
CPC .......... *F01D 21/003* (2013.01); *F01D 17/08* (2013.01); *F02C 7/04* (2013.01); *F02C 7/32* (2013.01);
(Continued)

(58) Field of Classification Search
CPC ........ F01D 21/003; F01D 17/02; F01D 17/08; F01D 17/085; F02C 7/04; F05D 2240/151; F05D 2260/83; G01M 15/14
See application file for complete search history.

(56) References Cited

U.S. PATENT DOCUMENTS 3,343,417 A * 9/1967 Peek, Jr. ............. G01L 19/0007
374/143
4,433,584 A * 2/1984 Kokoszka ............... G01P 5/175
73/861.66
(Continued)

FOREIGN PATENT DOCUMENTS

WO    2015119792 A1    8/2015

OTHER PUBLICATIONS

European Search Report Issued in EP Application No. 18201627.9, dated Feb. 20, 2019, 9 Pages.

*Primary Examiner* — Carlos A Rivera
(74) *Attorney, Agent, or Firm* — Cantor Colburn LLP (57) ABSTRACT

A performance measurement system of an inlet of a gas turbine engine includes a probe strut configured for installation to a case strut of an inlet case of a gas turbine engine. The probe strut includes one or more probes extending therefrom configured to measure one or more characteristics of an airflow past the one or more probes, a first attachment point configured to secure the probe strut to a hub portion of the inlet case, and a second attachment point configured to secure the probe strut to an outer case portion of the inlet case. A data acquisition module is located at a central longitudinal axis of the inlet and is operably connected to the probe to collect sensed data therefrom. The probe strut and the data acquisition module are configured to be installed, removed, and/or relocated without removal of the inlet case from the gas turbine engine.

20 Claims, 5 Drawing Sheets

(51) Int. Cl.
*G01M 15/14* (2006.01)
*F01D 17/08* (2006.01)
*F02C 7/32* (2006.01)
*F02C 3/04* (2006.01)

(52) U.S. Cl.
CPC ............... *G01M 15/14* (2013.01); *F02C 3/04* (2013.01); *F05D 2220/32* (2013.01); *F05D 2240/121* (2013.01); *F05D 2240/55* (2013.01); *F05D 2260/30* (2013.01); *F05D 2260/83* (2013.01)

(56) References Cited

U.S. PATENT DOCUMENTS

| | | | | |
|---|---|---|---|---|
| 4,605,315 | A | * | 8/1986 | Kokoszka ............... G01K 13/02 374/138 |
| 4,765,751 | A | * | 8/1988 | Pannone ................. F01D 17/02 374/135 |
| 4,872,807 | A | | 10/1989 | Thompson |
| 7,111,982 | B1 | | 9/2006 | Swonger, Jr. |
| 9,334,807 | B2 | | 5/2016 | Degaribody |
| 2012/0216608 | A1 | | 8/2012 | Schleif et al. |
| 2014/0352313 | A1 | * | 12/2014 | Schott ........................ F02C 7/04 60/751 |
| 2015/0110602 | A1 | | 4/2015 | Radeljak et al. |
| 2016/0348531 | A1 | * | 12/2016 | Rice ......................... F01D 17/08 |
| 2017/0138216 | A1 | * | 5/2017 | Giordan .................... G01P 5/14 |

* cited by examiner

INLET PERFORMANCE MEASUREMENT SYSTEM FOR GAS TURBINE ENGINE

BACKGROUND

Exemplary embodiments pertain to the art of gas turbine engines. More particularly, the present disclosure relates to measurement of performance characteristics of the gas turbine engine at the inlet.

During development and testing of gas turbine engine, it is desired to measure certain characteristics, such as pressures and/or temperatures at select locations of the gas turbine engine. The collected data is utilized to evaluate performance of the gas turbine engine, compared to an expected performance.

One such area of interest is the inlet of the gas turbine engine. Systems for measuring characteristics such as pressure and temperature at the inlet, however, are typically cumbersome to install and remove, and require significant amounts of disassembly and reassembly of the engine to repair to replace sensors or other components that may fail during operation. As such, the efficiency of the testing operation is greatly reduced.

BRIEF DESCRIPTION

In one embodiment, a performance measurement system of an inlet of a gas turbine engine includes a probe strut configured for installation to a case strut of an inlet case of a gas turbine engine. The probe strut includes one or more probes extending therefrom configured to measure one or more characteristics of an airflow past the one or more probes, a first attachment point configured to secure the probe strut to a hub portion of the inlet case, and a second attachment point configured to secure the probe strut to an outer case portion of the inlet case. A data acquisition module is located at a central longitudinal axis of the inlet and is operably connected to the probe to collect sensed data therefrom. The probe strut and the data acquisition module are configured to be installed, removed, and/or relocated without removal of the inlet case from the gas turbine engine.

Additionally or alternatively, in this or other embodiments the probe strut is configured to be secured to the hub portion via one or more bolts.

Additionally or alternatively, in this or other embodiments the probe strut is configured to be secured to the outer case portion via a pin.

Additionally or alternatively, in this or other embodiments the probe is configured to measure one or more of temperature, steady state pressure, high response pressure, Mach number, or angle of attack.

Additionally or alternatively, in this or other embodiments two or more probe struts are configured for installation to two or more case struts of the inlet case.

Additionally or alternatively, in this or other embodiments a first probe strut of the two or more probe struts includes a first probe configured for a first measurement, and a second probe strut of the two or more probe struts includes a second probe configured for a second measurement different from the first measurement.

In another embodiment, an inlet assembly for a gas turbine engine includes an inlet case including a hub portion, an outer case portion, and a plurality of case struts extending from the hub portion to the outer case portion. The inlet assembly includes a performance measurement system including a probe strut installed to a case strut of plurality of case struts, The probe strut includes one or more probes extending therefrom configured to measure one or more characteristics of an airflow past the one or more probes, a first attachment point to secure the probe strut to the hub portion, and a second attachment point to secure the probe strut to the outer case portion. A data acquisition module is located at the hub portion and is operably connected to the probe to collect sensed data therefrom. The probe strut and the data acquisition module are configured to be installed, removed, and/or relocated without removal of the inlet case from the gas turbine engine.

Additionally or alternatively, in this or other embodiments the probe strut is secured to the hub portion via one or more bolts.

Additionally or alternatively, in this or other embodiments the probe strut is secured to the outer case portion via a pin.

Additionally or alternatively, in this or other embodiments the probe is configured to measure one or more of temperature, steady state pressure, high response pressure, Mach number, or angle of attack.

Additionally or alternatively, in this or other embodiments two or more probe struts are installed to two or more case struts of the inlet case.

Additionally or alternatively, in this or other embodiments a first probe strut of the two or more probe struts includes a first probe configured for a first measurement, and a second probe strut of the two or more probe struts includes a second probe configured for a second measurement different from the first measurement.

Additionally or alternatively, in this or other embodiments a seal is positioned between the case strut and the probe strut.

In yet another embodiment, a gas turbine engine includes a compressor section, a combustor section, a turbine section, and an inlet section located upstream of the compressor section. The inlet section includes an inlet case including a hub portion, an outer case portion, and a plurality of case struts extending from the hub portion to the outer case portion. The inlet section also includes a performance measurement system including a probe strut installed to a case strut of plurality of case struts. The probe strut includes one or more probes extending therefrom configured to measure one or more characteristics of an airflow past the one or more probes, a first attachment point to secure the probe strut to the hub portion, and a second attachment point to secure the probe strut to the outer case portion. A data acquisition module is located at the hub portion and is operably connected to the probe to collect sensed data therefrom. The probe strut and the data acquisition module are configured to be installed, removed, and/or relocated without removal of the inlet case from the gas turbine engine.

Additionally or alternatively, in this or other embodiments the probe strut is secured to the hub portion via one or more bolts.

Additionally or alternatively, in this or other embodiments the probe strut is secured to the outer case portion via a pin.

Additionally or alternatively, in this or other embodiments the probe is configured to measure one or more of temperature, steady state pressure, high response pressure, Mach number, or angle of attack.

Additionally or alternatively, in this or other embodiments two or more probe struts are installed to two or more case struts of the inlet case.

Additionally or alternatively, in this or other embodiments a first probe strut of the two or more probe struts includes a first probe configured for a first measurement, and a second probe strut of the two or more probe struts includes a second probe configured for a second measurement different from the first measurement.

Additionally or alternatively, in this or other embodiments a seal is positioned between the case strut and the probe strut.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
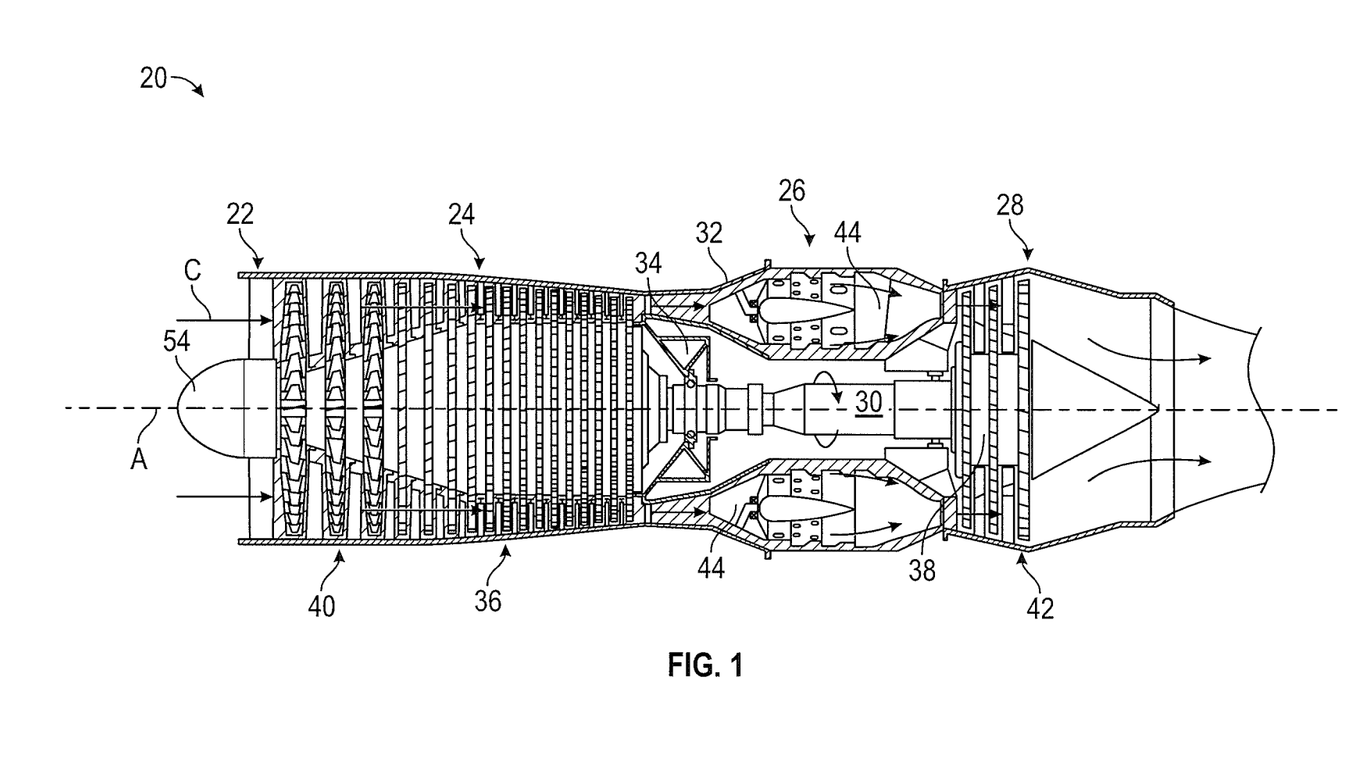
FIG. 1 is a cross-sectional view of an embodiment of a gas turbine engine.

FIG. 1 schematically illustrates a gas turbine engine 20. The gas turbine engine 20 is disclosed herein as a turbojet engine that generally incorporates an inlet section 22, a compressor section 24, a combustor section 26 and a turbine section 28. Alternative engines might include an augmentor section (not shown) among other systems or features. Further, while a turbojet configuration is illustrated and described herein, one skilled in the art will readily appreciate that the present disclosure may be readily utilized on other engine configurations, such as turbofan engines. The compressor section 24 drives air through the inlet section 22 and along a core flow path C for compression and communication into the combustor section 26 then expansion through the turbine section 28.

The exemplary engine 20 generally includes a shaft 30 connecting the compressor section 24 and the turbine section 28, with the shaft 30 mounted for rotation about an engine central longitudinal axis A relative to an engine static structure 32 via several bearing systems 34. It should be understood that various bearing systems 34 at various locations may alternatively or additionally be provided, and the location of bearing systems 34 may be varied as appropriate to the application. Further, while a single shaft 30 is illustrated and described herein, other engines may utilize a two-spool configuration, with a first shaft connecting a high pressure compressor 36 to a high pressure turbine 38, and a second shaft concentric to the first shaft connecting a low pressure compressor 40 to a low pressure turbine 42.

The core airflow is compressed by the low pressure compressor 40 then the high pressure compressor 36, mixed and burned with fuel in a combustor 44 of the combustor section 26, then expanded over the high pressure turbine 38 and low pressure turbine 42. The turbines 38, 42 drive the shaft 30 in response to the expansion.

Figure 2:
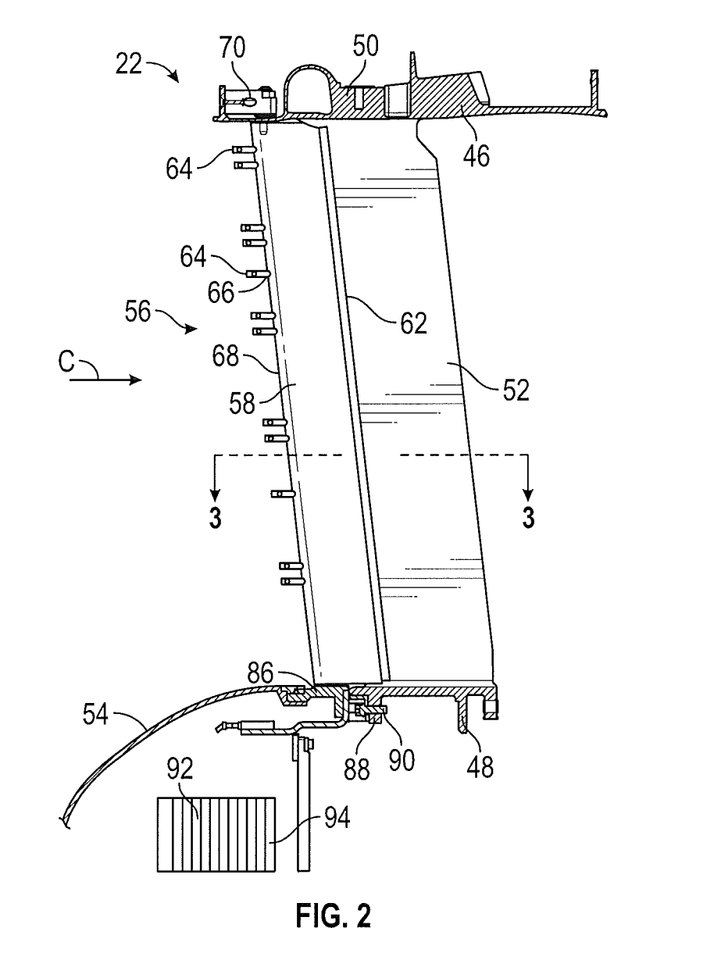
FIG. 2 is a partial cross-sectional view of an embodiment of an inlet portion of a gas turbine engine.

Referring now to FIG. 2, shown is a partial cross-sectional view of the inlet section 22. The inlet section 22 includes an inlet case 46 located at the engine central longitudinal axis A. The inlet case 46 includes a hub portion 48 and an outer case portion 50, with a plurality of case struts 52 extending from the hub portion 48 to the outer case portion 50, with an inlet area of the core flowpath C defined between the hub portion 48 and the outer case portion 50. In some embodiments, a nose cone 54 is provided at the hub portion 48.

A performance measurement system 56 is installed on the inlet section 22 to obtain performance data regarding the inlet section 22 during operation of the engine 20. The performance measurement system 56 includes a probe strut 58 located at one or more of the case struts 52, in particular located over a case strut leading edge 60, as shown best in FIG. 3. In some embodiments, a seal 62 is positioned between the probe strut 58 and the case strut 52, providing an interface therebetween and preventing aerodynamic leakage between the probe strut 58 and the case strut 52. The seal 62 extends along the probe strut 58 length and in some embodiments is formed from a silicone material. It is to be appreciated, however, that other seal configurations and/or seal materials may be utilized.

Figure 3:
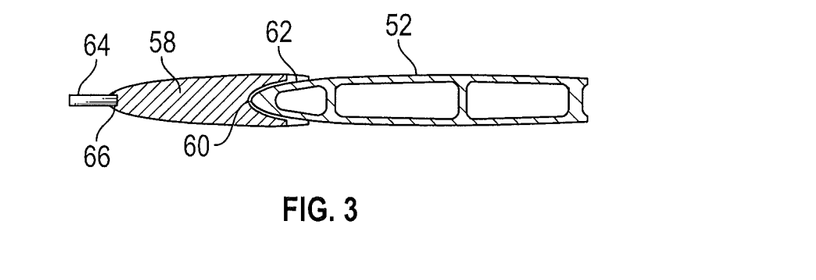
FIG. 3 is a cross-sectional view of an embodiment of a probe strut installed at a case strut.

The probe strut 58 is configured with one or more probes 64 extending therefrom into the core airflow C. The probes 64 are configured to measure one or more of temperature, steady state pressure, high response pressure, side static at various flow angles at the same time. Further, the probes 64 may be configured to measure Mach number, angle of attack, or the like. The probes 64 extend through openings 66 formed in, for example, a probe strut leading edge 68, and extend upstream from the probe strut leading edge 68. The probes 64 are secured in the openings 66 via, for example, adhesive bonding, welding or brazing, mechanical fasteners such as a nut and bolt arrangement, or other means.

Figure 4:
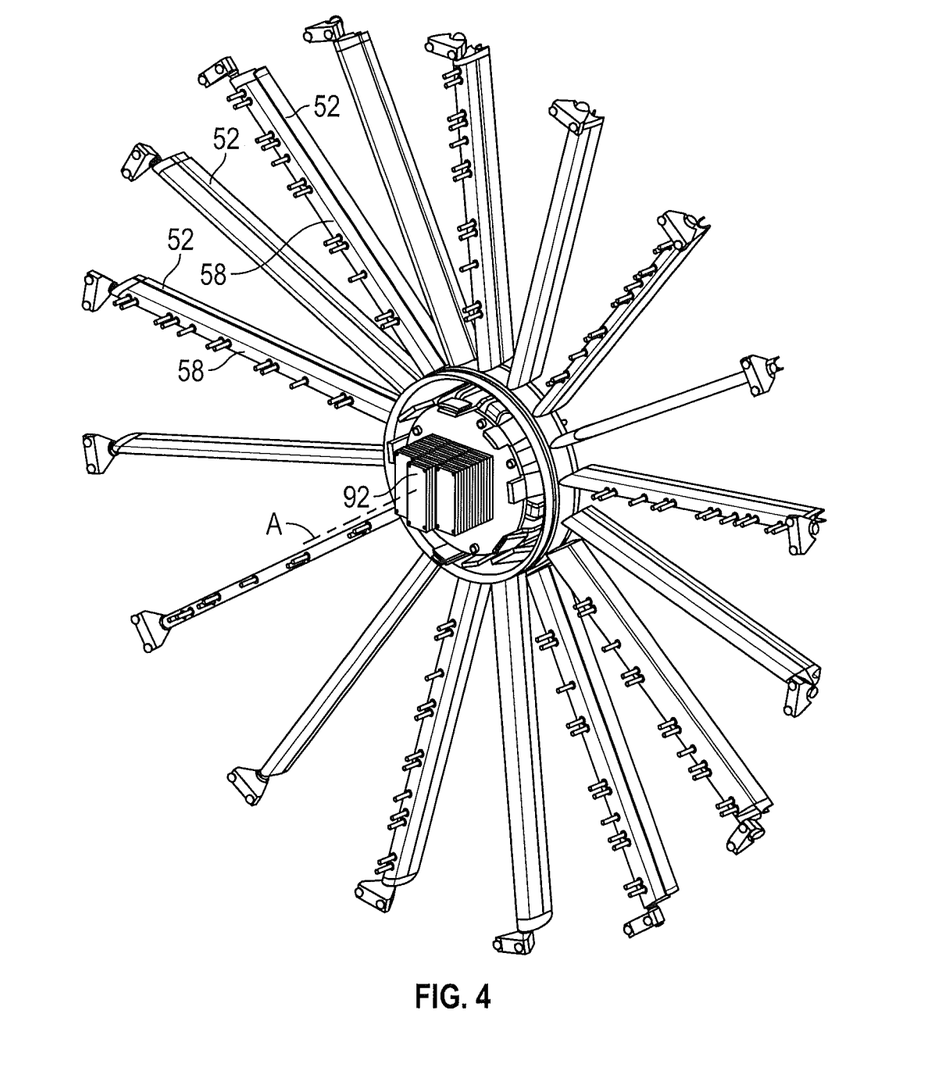
FIG. 4 is a schematic view illustrating an arrangement of struts about a circumference of an inlet case.

Referring to FIG. 4, the probe struts 58 may be located at selected case struts 52 of the plurality of case struts 52 to perform measurements at selected circumferential locations of the inlet section 22, such as shown. In some embodiments, case struts 52 including probe struts 58 are alternated with case struts located at selected case struts 52, while not located at other case struts 52 between the selected case struts 52. Alternatively, other arrangements may be utilized, such as equipping each case strut 52 with a probe strut 58, or equipping a single case strut 52 with a probe strut 58.

The use of probe struts 58 installed at the case struts 52 provides flexibility in that the arrangement of probe struts 58 may be changed by adding probe struts 58, removing probe struts 58, and/or relocating probe struts 58 without the need for removal of the inlet case 46 from the engine 20. Referring again to FIG. 2, the probe strut 58 is secured to the inlet case 46 at the outer case portion 50 via a strut pin 70 extending through the outer case portion 50 into the probe strut 58.

Figure 5A:
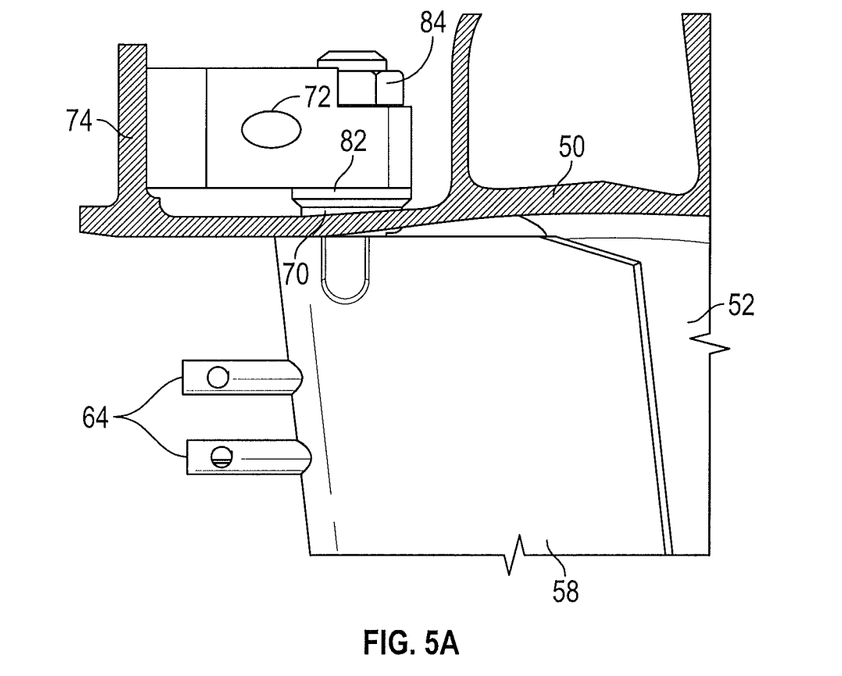
FIG. 5A is a partial cross-sectional view of an attachment of a probe strut at an outer case portion.
Figure 5B:
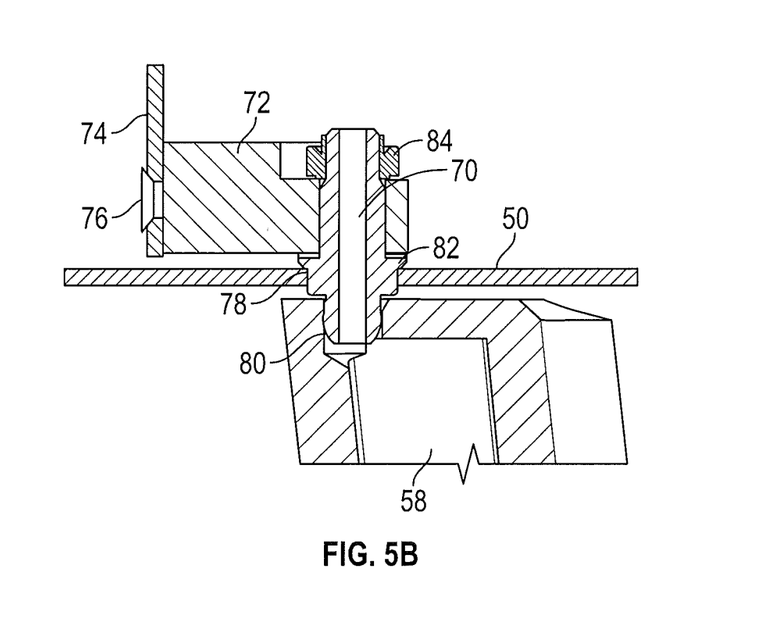
FIG. 5B is another partial cross-sectional view of an attachment of a probe strut at an outer case portion.

The strut pin 70 arrangement is shown in more detail in FIGS. 5a and 5b. A pin holder 72 is secured to on outer surface 74 of the outer case portion 50, via for example, fastener 76. The strut pin 70 is secured in the pin holder 72 by, for example, a pin fastener 84. The strut pin 70 extends radially inwardly from the pin holder 72 through a case pin opening 78 in the outer case portion 50 and into a strut pin opening 80 in the probe strut 58. In some embodiments, the strut pin 70 includes a pin lip 82 to prevent the strut pin 70 from falling entirely through the pin opening 80 into the core flow path C.

Figure 5C:
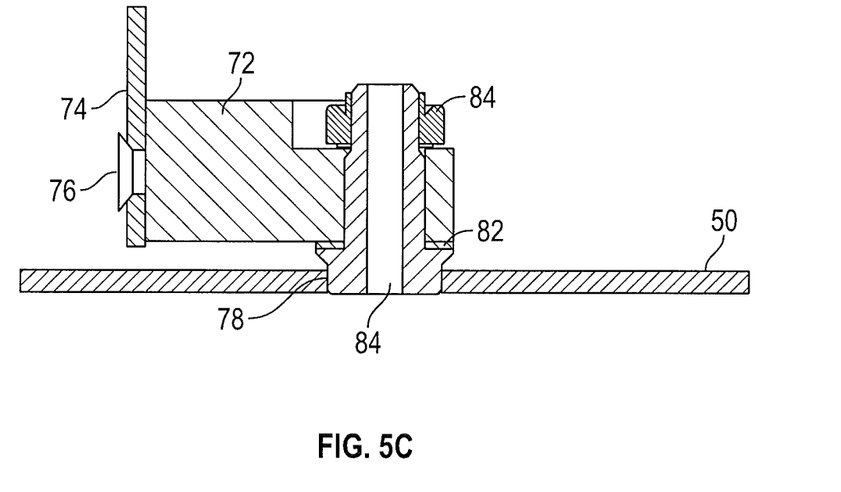
FIG. 5C is a partial cross-sectional view of an embodiment of and outer case portion.

Referring now to FIG. 5c, the inlet case 46 may be configured with strut pin openings 80 at each case strut 52. In the event that a probe strut 58 is not installed at a selected case strut 52, the pin opening 80 is closed via a plug 84, which replaces the strut pin 70 in the pin holder 72.

Figure 6:
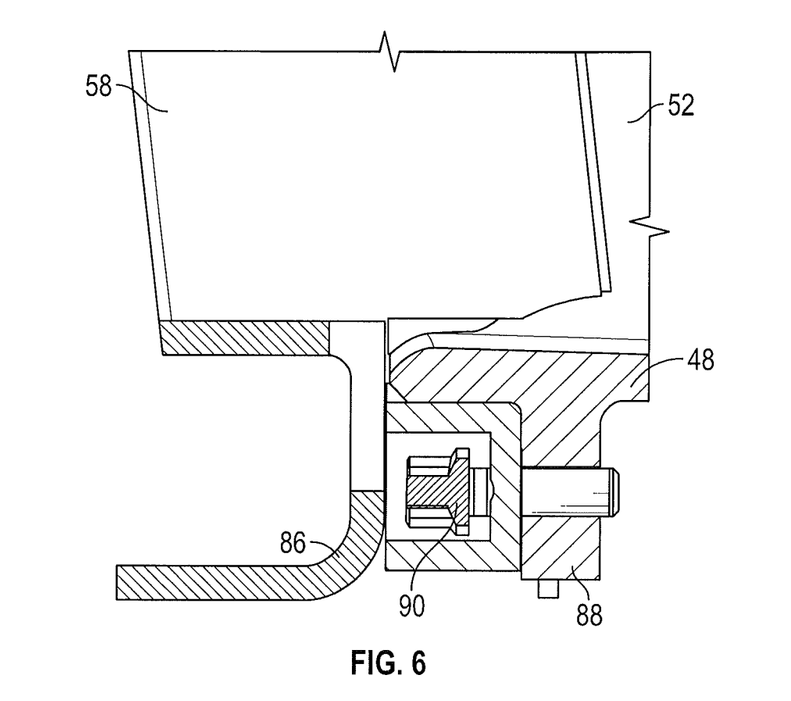
FIG. 6 is a partial cross-sectional view of an attachment of a probe strut at a hub portion of an inlet case.

Referring again to FIG. 2, the probe strut 58 is secured to the hub portion 48 of the inlet case 46 via a support bracket 86 extending from a radially innermost portion of the probe strut 58. Referring now to FIG. 6, the support bracket 86 is secured to a hub flange 88 of the hub portion 48 via at least one bolt or other fastener 90 extending through the support bracket 86 and into the hub flange 88 to secure the support bracket 86 to the hub flange 88. In some embodiments, the support bracket 86 is formed integral to the probe strut 58, while in other embodiments the components are formed separately and joined via a secondary process.

Referring again to FIG. 2, in some embodiments the performance measurement system 56 includes one or more data acquisition modules 92 located, for example, at the hub portion 48 of the inlet case 46 downstream of the nosecone 54. The data acquisition modules 92 are connected to the probes 64 and are configured to collect the data sensed by the probes 64 and may perform processing operations on the collected data, and may perform other operations such as formatting or storage of the collected data. Further, the data acquisition modules 92 may include a communications module 94 to transmit the collected data over a wired or wireless connection to, for example, a computer (not shown). In the embodiments with a wired connection is utilized, the inlet case 46 may use one or more dummy struts through which wires and/or other components are installed to provide the wired interface between the data acquisition modules 94 and the computer.

The performance measurement systems 56 disclosed herein improve flexibility of data measurement and collection at the inlet section 22 because a variety of different probe combinations can be placed at various selected locations. This is due to the attachments at the outer case portion 50 and the hub portion 48, which also allow the probe struts 58 to be removed, installed, and/or relocated without removal of the inlet case 46 from the engine 20. It is also possible to remove the probe struts 58 and plug the pin openings 80 to configure the inlet case 46 as a non instrumented inlet case 46. Further, by locating the data acquisition modules 92 at the hub portion 48 behind the nose cone 54, the location is centralized thus reducing installation time, and equalize a length of pressure line utilized among the probe struts 58 for improved data consistency, and also allows for repair and replacement of the probe struts 58 without inlet case 46 or engine 20 removal.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A performance measurement system of an inlet of a gas turbine engine comprising:
    a probe strut installed to a case strut of an inlet case of a gas turbine engine, including:
        one or more probes extending therefrom configured to measure one or more characteristics of an airflow past the one or more probes;
        a first attachment point configured to secure the probe strut to a hub portion of the inlet case; and
        a second attachment point configured to secure the probe strut to an outer case portion of the inlet case;
        a data acquisition module disposed at a central longitudinal axis of the inlet and operably connected to the probe to collect sensed data therefrom;
        wherein the probe strut and the data acquisition module are configured to be installed, removed, and/or relocated without removal of the inlet case from the gas turbine engine.

2. The performance measurement system of claim 1, wherein the probe strut is configured to be secured to the hub portion via one or more bolts.

3. The performance measurement system of claim 1, wherein the probe strut is configured to be secured to the outer case portion via a pin.

4. The performance measurement system of claim 1, wherein the probe is configured to measure one or more of temperature, steady state pressure, high response pressure, Mach number, or angle of attack.

5. The performance measurement system of claim 1, further comprising two or more probe struts configured for installation to two or more case struts of the inlet case.

6. The performance measurement system of claim 5, wherein:
    a first probe strut of the two or more probe struts includes a first probe configured for a first measurement; and
    a second probe strut of the two or more probe struts includes a second probe configured for a second measurement different from the first measurement.

7. An inlet assembly for a gas turbine engine comprising:
    an inlet case including:
        a hub portion;
        an outer case portion; and
        a plurality of case struts extending from the hub portion to the outer case portion; and
        a performance measurement system including:
            a probe strut installed to a case strut of plurality of case struts including:
                one or more probes extending therefrom configured to measure one or more characteristics of an airflow past the one or more probes;
                a first attachment point to secure the probe strut to the hub portion; and a second attachment point to secure the probe strut to the outer case portion; and a data acquisition module disposed at the hub portion and operably connected to the probe to collect sensed data therefrom;

wherein the probe strut and the data acquisition module are configured to be installed, removed, and/or relocated without removal of the inlet case from the gas turbine engine.

8. The inlet assembly of claim 7, wherein the probe strut is secured to the hub portion via one or more bolts.

9. The inlet assembly of claim 7, wherein the probe strut is secured to the outer case portion via a pin.

10. The inlet assembly of claim 7, wherein the probe is configured to measure one or more of temperature, steady state pressure, high response pressure, Mach number, or angle of attack.

11. The inlet assembly of claim 7, further comprising two or more probe struts installed to two or more case struts of the inlet case.

12. The inlet assembly of claim 11, wherein:
a first probe strut of the two or more probe struts includes a first probe configured for a first measurement; and
a second probe strut of the two or more probe struts includes a second probe configured for a second measurement different from the first measurement.

13. The inlet assembly of claim 7, further comprising a seal disposed between the case strut and the probe strut.

14. A gas turbine engine comprising:
a compressor section;
a combustor section;
a turbine section; and
an inlet section disposed upstream of the compressor section, including:
an inlet case including:
a hub portion;
an outer case portion; and
a plurality of case struts extending from the hub portion to the outer case portion; and a performance measurement system including:
a probe strut installed to a case strut of plurality of case struts including:
one or more probes extending therefrom configured to measure one or more characteristics of an airflow past the one or more probes;
a first attachment point to secure the probe strut to the hub portion; and
a second attachment point to secure the probe strut to the outer case portion; and
a data acquisition module disposed at the hub portion and operably connected to the probe to collect sensed data therefrom;
wherein the probe strut and the data acquisition module are configured to be installed, removed, and/or relocated without removal of the inlet case from the gas turbine engine.

15. The gas turbine engine of claim 14, wherein the probe strut is secured to the hub portion via one or more bolts.

16. The gas turbine engine of claim 14, wherein the probe strut is secured to the outer case portion via a pin.

17. The gas turbine engine of claim 14, wherein the probe is configured to measure one or more of temperature, steady state pressure, high response pressure, Mach number, or angle of attack.

18. The gas turbine engine of claim 14, further comprising two or more probe struts installed to two or more case struts of the inlet case.

19. The gas turbine engine of claim 18, wherein:
a first probe strut of the two or more probe struts includes a first probe configured for a first measurement; and
a second probe strut of the two or more probe struts includes a second probe configured for a second measurement different from the first measurement.

20. The gas turbine engine of claim 14, further comprising a seal disposed between the case strut and the probe strut.

* * * * *